(12) United States Patent
Ghiron et al.

(10) Patent No.: US 7,020,364 B2
(45) Date of Patent: Mar. 28, 2006

(54) PERMANENT LIGHT COUPLING ARRANGEMENT AND METHOD FOR USE WITH THIN SILICON OPTICAL WAVEGUIDES

(75) Inventors: Margaret Ghiron, Allentown, PA (US); Prakash Gothoskar, Allentown, PA (US); Robert Keith Montgomery, Easton, PA (US); Vipulkumar Patel, Monmouth Junction, NJ (US); Soham Pathak, Allentown, PA (US); Kalpendu Shastri, Orefield, PA (US); Katherine A. Yanushefski, Zionsville, PA (US)

(73) Assignee: SiOptical Inc., Allentown, PA (US)

( * ) Notice: Subject to any disclaimer, the term of this patent is extended or adjusted under 35 U.S.C. 154(b) by 57 days.

(21) Appl. No.: 10/668,947

(22) Filed: Sep. 23, 2003

(65) Prior Publication Data

US 2004/0190826 A1    Sep. 30, 2004

Related U.S. Application Data

(60) Provisional application No. 60/459,349, filed on Mar. 31, 2003.

(51) Int. Cl.
*G02B 6/34* (2006.01)
(52) U.S. Cl. .............................. 385/36; 385/39; 385/51
(58) Field of Classification Search .................. 385/36, 385/30, 31, 39, 48, 51, 129–131; 359/831–837
See application file for complete search history.

(56) References Cited

U.S. PATENT DOCUMENTS

| | | | | |
|---|---|---|---|---|
| 3,883,221 A | * | 5/1975 | Rigrod | 385/36 |
| 4,877,301 A | * | 10/1989 | Yokomori et al. | 385/37 |
| 4,979,788 A | * | 12/1990 | Brazas, Jr. | 385/14 |
| 5,235,589 A | * | 8/1993 | Yokomori et al. | 369/112.27 |
| 6,021,239 A | * | 2/2000 | Minami et al. | 385/36 |
| 2003/0118306 A1 | * | 6/2003 | Deliwala | 385/125 |

* cited by examiner

*Primary Examiner*—Sung Pak
(74) *Attorney, Agent, or Firm*—Wendy W. Koba

(57) ABSTRACT

A trapezoidal shaped single-crystal silicon prism is formed and permanently attached to an SOI wafer, or any structure including a silicon optical waveguide. In order to provide efficient optical coupling, the dopant species and concentration within the silicon waveguide is chosen such that the refractive index of the silicon waveguide is slightly less than that of the prism coupler (refractive index of silicon≈3.5). An intermediate evanescent coupling layer, disposed between the waveguide and the prism coupler, comprises a refractive index less than both the prism and the waveguide. In one embodiment, the evanescent coupling layer comprises a constant thickness. In an alternative embodiment, the evanescent coupling layer may be tapered to improve coupling efficiency between the prism and the waveguide. Methods of making the coupling arrangement are also disclosed.

23 Claims, 10 Drawing Sheets

PERMANENT LIGHT COUPLING ARRANGEMENT AND METHOD FOR USE WITH THIN SILICON OPTICAL WAVEGUIDES

CROSS-REFERENCE TO RELATED APPLICATION

This application claims the benefit of Provisional Application No. 60/459,349, filed Mar. 31, 2003.

TECHNICAL FIELD

The present invention relates to a light coupling arrangement for use with thin silicon optical waveguides and, more particularly to arrangements and methods of making silicon-based prism couplers that are permanently attached to silicon-based optoelectronic arrangements.

BACKGROUND OF THE INVENTION

To meet the bandwidth requirements of current and future high-speed applications, state-of-the-art telecommunication components and systems must provide a host of sophisticated signal processing and routing functions, both in the optical and electronic domains. As the complexity level increases, integration of more functions and components within a single package is required to meet system-level requirements and reduce the associated size and cost of the end system. It has been recognized for some time that the integrated circuit devices, processes and techniques that revolutionized the electronics industry can be adapted to produce optoelectronic integrated circuits. In typical optoelectronic integrated circuits, light propagates through waveguides of high-refractive-index materials such as silicon, gallium arsenide, lithium niobate, or indium phosphide. The use of high-index materials enables smaller size devices, as a higher degree of mode confinement and tighter bends may be accommodated. While all transmitter, signal processing and receiver functions may be incorporated in a single optoelectronic integrated circuit, the system may also be constructed from more than one package, in what is defined herein as "multi-module integration". Multi-module optoelectronic integration is required when a desired component is incompatible with the integrated device. In some cases, no method of fabricating the component is compatible with the technology being considered, while in others it may be impossible to realize the full set of specifications for the component in the integration platform. Even if all the components are readily achievable in a single integrated device, multi-module optoelectronic integration will still be required to meet all user needs. For example, the end user may require only a limited subset of the transmit/process/receive functions, or the user may desire specific or unique physical input and output signal configurations.

Multi-module optoelectronic integration is crucial to the success of silicon-based optoelectronic integrated circuits. A clear advantage of using silicon-based optoelectronic integrated circuits stems from the fact that many required tools, techniques, and processes have already been developed in silicon to meet the needs of conventional electronics. In addition, the material costs of silicon-based devices are considerably lower than those for competing technologies such as gallium arsenide or indium phosphide. However, since silicon-based lasers are just beginning to be developed, it is not currently possible to incorporate the light source in the same silicon wafer as the signal processing and receiver elements. Thus, the light signal must be introduced to the silicon waveguide from an external source.

One common external source is a separate laser module emitting a free space beam, followed by optical elements to shape, focus, and steer the beam, or adjust its polarization state. A second common external source configuration consists of a fiber-connected (referred to in the art as "pigtailed") laser module or another light signal delivered through an optical fiber, again followed by a similar train of optical elements. While receiving elements may be incorporated in the silicon wafer as on-chip or integrated detectors, there are many applications where the user will need direct access to the optical signal after the on-chip functions have been performed. Thus it is appropriate to provide an optical output port that would generally be a fiber-based termination, although the preferred embodiments do not exclude other output configurations.

A common prior art technique for coupling light from an external source to a silicon waveguide is to cleave end facets on both the waveguide and the mating fiber termination. Examples of fiber terminations include, but are not limited to: multimode or single-mode fibers with small or zero cleave angles, and specially-shaped or lensed single-mode fibers that produce spot sizes as small as 1.5 µm. The fiber termination is aligned to allow maximum light transmission through the waveguide, and then fixed in position. Anti-reflection (AR) coatings can be used on both the fiber termination and the waveguide facet to reduce the Fresnel losses. Since input and output ports for devices must be located at edge facets of the waveguide-containing wafer die, significant restrictions on device geometry (e.g., topology and/or size) are imposed by using this prior art edge coupling constraint.

The above-described edge coupling technique is effective if the mode-field diameter of the desired mode in the waveguide is similar to the spot size associated with the fiber termination, and if the numerical apertures (NAs) of the fiber termination and waveguide are well-matched. However, in many practical applications, silicon waveguides must be relatively thin, having a thicknesses of less than 0.35 µm (with a numerical aperture (NA) essentially equal to 1) to remain single-mode in the vertical direction and enable high-speed electronic applications. By way of comparison, single mode fibers that are commonly used for telecommunications applications have mode field diameters ranging from 2.5–10 µm, with NAs ranging from 0.1–0 4. Therefore, it is clear that this edge coupling technique is not readily applicable for use with relatively thin, sub-micron single mode silicon waveguides.

As direct coupling in the above-described manner does not provide a sufficiently small spot size, alternative techniques to transfer light into the waveguide must be used. In one prior art technique, light is incident on a periodic grating structure that may be fabricated through conventional lithographic techniques. See, for example, *Fundamentals of Optoelectronics*, Chicago, Richard D. Irwin, Inc., by C. Pollock, 1995, at pages 309–320.

In a second prior art technique, the beam is incident upon an optical element of high-index material that is disposed in very close proximity to the waveguide of interest. One exemplary arrangement of this technique is disclosed in an article entitled "Theory of Prism-Film Coupler and Thin-Film Light Guides" by P. K. Tien et al., appearing in the *Journal of the Optical Society of America*, Vol. 60, 1970 at pages 1325–1337. In this context, "very close proximity" is intended to mean that the separation distance between the optical element and the waveguide permits evanescent coupling of light from the optical element to the waveguide. In order for evanescent coupling to occur, the medium separating the optical element from the waveguide must have a refractive index that is lower than those associated with the optical element and waveguide materials. In addition, the refractive index of the launch optical element must equal or exceed that of the waveguide material. In order to couple light efficiently from the optical element to the waveguide for a specified wavelength and waveguide thickness, light must be incident on the waveguide at a specific angle of incidence. To readily achieve the required angle of incidence, the optical element is frequently fabricated in the form of a prism. By varying the angle of incidence of the external beam on the angled facet of the prism, the beam inside the prism can be refracted at the desired angle. For this reason, the evanescent technique is generally referred to in the art as "prism coupling".

While coupling light into and out of a thin waveguide by launching light into and retrieving light from a high-index prism or prisms in close proximity to the waveguide layer is a well-established technique in laboratory and waveguide characterization applications, the physical connection of the prisms to the waveguide is temporary and not appropriate for a finished device that will be subjected to typical user conditions. Several innovative developments are required before prism coupling techniques can be effectively utilized to couple a significant amount of light into and out of a device prototype or a finished product.

For example, methods of physically attaching prisms and waveguides to produce dimensionally stable interfaces with both a high degree of mechanical integrity and sufficient optical transmission are virtually undeveloped. Another key element is to identify and develop appropriate materials and mass production techniques for prism structures. Each prism element must be visually inspected and optically tested to verify that it meets the stringent optical and mechanical specifications required by most prism coupling applications. Thus, current methods of prism fabrication cannot be readily transferred to efficient production of device structures requiring multiple input and output ports. Moreover, the high-index material prisms (for example, titanium dioxide—rutile) used in the prior art for waveguide evaluation cannot be used to evanescently couple light into silicon waveguides due to the refractive index mismatch. Additionally, manufacturable designs and methods of producing precision prism structures, and appropriate methods of maintaining the required set of geometrical constraints governing the prism, evanescent coupling layer, waveguide, and input and output beams over a typical device lifetime remain lacking in the prior art.

Thus, a need remains in the art for a robust technique for evanescently coupling light into and out of thin silicon waveguides, with the coupling arrangement being permanently attached to the optoelectronic circuit.

SUMMARY OF THE INVENTION

The need remaining in the prior art is addressed by the present invention, which relates to a light coupling arrangement for use with thin silicon optical waveguides and, more particularly, to arrangements and methods of making silicon-based prism couplers that are permanently attached to silicon-based optoelectronic arrangements.

In accordance with the present invention, specific embodiments of permanently-coupled prism and waveguide structures appropriate for use with sub-micron silicon waveguides in the wavelength bands of interest for telecommunications application are disclosed. Specification and control of parameters critical to device operation such as material choice, device geometry and associated tolerances, fabrication and stability of the evanescent coupling layer or medium, and beam size, quality, and shape are discussed. Methods of fabricating the inventive device that are consistent with the choices and tolerances of these critical parameters are given.

In accordance with the present invention, a trapezoidal single-crystal silicon prism is formed and permanently attached so as to make optical contact to an SOI wafer (or any structure including a relatively thin, sub-micron silicon waveguide). Wafer-to-wafer bonding is the preferred method for attaching a prism wafer to an SOI wafer. Alternatively, die-to-die or die-to-wafer bonding may be used in performing the present invention. Additionally, it is possible to attach the prism wafer (or die) to the SOI wafer (or die) by bringing the two mating surfaces into close proximity or creating optical contact, and thereafter using an adhesive to complete the attachment.

In order to provide optical coupling in accordance with the present invention, the silicon waveguide is doped to exhibit a refractive index that is slightly less than the prism coupler (refractive index of silicon $\approx 3.5$). An intermediate evanescent coupling layer, disposed between the waveguide and the prism coupler, is formed of a material with a refractive index less than both the prism and the waveguide. In one embodiment, the evanescent coupling layer comprises a constant thickness. In an alternative embodiment, the thickness of the evanescent coupling layer changes monotonically (along the direction of propagation in the waveguide) to improve the coupling efficiency between the prism and the waveguide. For the purposes of the present discussion, such an evanescent coupling layer will hereinafter be referred to as a "tapered" evanescent coupling layer.

In various embodiments of the present invention, the prism coupler may include a rectangular cavity etched into a prism base surface that is contiguous with the evanescent coupling layer. For embodiments that utilize an evanescent coupling layer of constant thickness, the cavity creates corner edges that function to truncate an incoming beam passing through the prism and improve coupling efficiency into the underlying silicon waveguide. In one embodiment, the entire base surface of the prism wafer (which may include one or more cavities) is covered with a material exhibiting a relatively low refractive index (for example, silicon dioxide). The tapered evanescent coupling layer is used in embodiments that do not require a cavity structure for optical coupling. However, cavity structures may be employed with any of the embodiments of the present invention to facilitate attachment of the prism coupler to a patterned SOI wafer or die.

The present invention details novel methods of fabricating high-index prism structures and utilizes silicon-based materials for the prism structure. Advantageously, precision silicon-based prism structures can be produced in quantity by well-known, wafer-scale silicon processing techniques. Novel methods of controlling the critical interface between the prism structure and the waveguide are introduced through the use of appropriate die-to-die, die-to-wafer or wafer-to-wafer alignment and bonding techniques. The inventive method of achieving high-efficiency coupling in thin silicon waveguides fabricated by silicon-on-insulator technology is made possible by these designs and techniques.

Other features and advantages of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
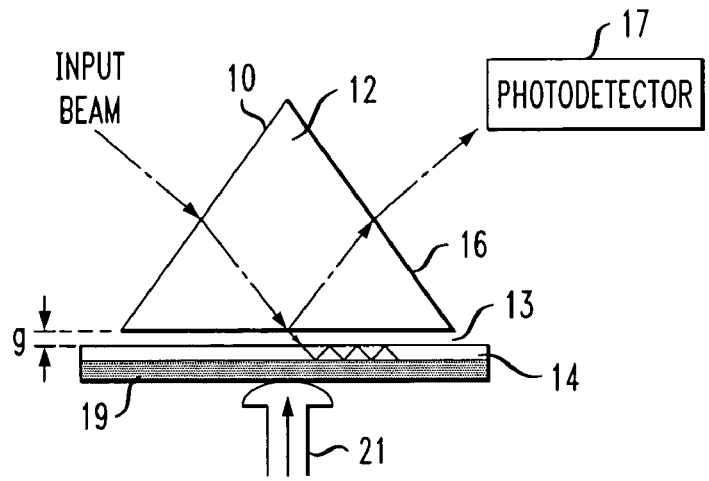
FIG. 1 illustrates an exemplary prior art prism coupling configuration utilized for waveguide characterization.
Figure 2:
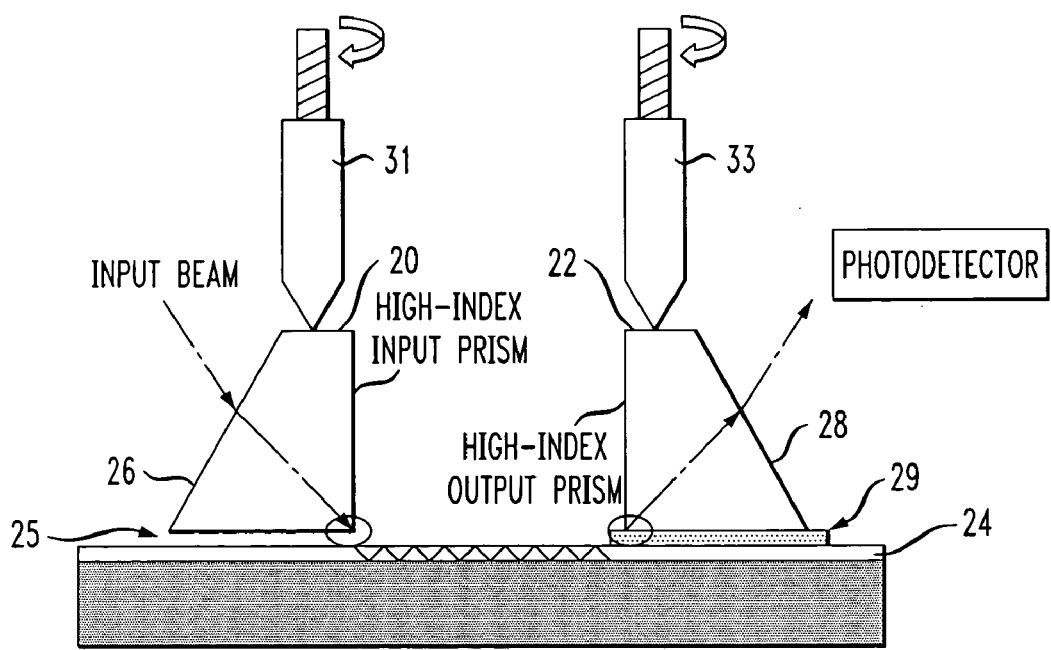
FIG. 2 illustrates another prior art waveguide characterization arrangement, this embodiment using a pair of prism couplers.

FIGS. 1 and 2 illustrate two well-known examples of prior art prism coupling arrangements that utilize the principle of evanescent coupling to introduce a light signal into a planar waveguide structure. In the arrangement of FIG. 1, a light beam is introduced from an external source to an input facet 10 of a prism 12 and thereafter propagates through prism 12, passes through an evanescent coupling medium 13 (in this case, air) and then into a waveguide 14. The light signal is then extracted from waveguide 14 by evanescently coupling light back out of waveguide 14 and into prism 12. Light is detected from output facet 16 of prism 12 via a photodetector 17 only when the angle of incidence fulfills the phase-matching condition determined by: (1) the polarization state of the input light signal; (2) the refractive indexes of prism 12, evanescent coupling medium 13, waveguide 14 and waveguide substrate 19; (3) the thickness (g) of evanescent coupling medium 13 and the thickness of waveguide 14; and (4) the order of the mode in the waveguide. By detecting light for two different modes, it is possible to use this configuration to extract information on the refractive index and thickness of the waveguide. In this prior art configuration, an actuator 21 is used to adjust the gap g between prism 12 and waveguide 14.

In the arrangement of FIG. 2, two separate prisms 20 and 22 are used to evanescently couple light into and out of a waveguide 24. A light beam is introduced from an external source to an input facet 26 of input prism 20 and then passes into waveguide 24 via evanescent coupling region 25. The light beam propagates along a predetermined length of waveguide 24 and is then coupled into output prism 22 and exits through output facet 28 of output prism 22. By varying the prism-to-prism distance, additional information can be extracted on the attenuation per unit length of the waveguide structure. As output prism 22 is typically separated from waveguide 24 by a few hundred nanometers, index-matching fluid 29 is generally used to facilitate moving output prism 22 laterally over the wafer to perform the measurement. Additionally, index-matching fluid 29 serves as the evanescent coupling medium and, therefore, must exhibit a refractive index and viscosity value that enables optical coupling. In this case, a first actuator 31 is used to control the gap spacing between input prism coupler 20 and waveguide 24, while a second actuator 33 is used to control the gap spacing between output prism coupler 22 and waveguide 24.

In the arrangements of both FIGS. 1 and 2, the motion of actuators 21, 31 and 33 must be extremely well-controlled. In particular, displacements in a direction normal to the mating prism and waveguide surfaces (i.e., motion that varies the thickness g as illustrated in FIG. 1) must be changed in nanometer-scale increments to optimize coupling efficiency. Such fine motion control requires the use of expensive and bulky piezoelectric drivers or stages. It is also imperative that the displacement is confined entirely to the normal axis; any motion along axes orthogonal to the normal will introduce a wedge angle between the mating surfaces. In addition, if the wedge angle does not permit the gap in the evanescent coupling region to assume a sufficiently small value (thus characterizing "very close proximity"—where this may occur if regions of the prism base physically contact the waveguide), no significant amount of light will be coupled through the arrangement.

For output prism 22 of FIG. 2, an additional actuation mechanism (not shown) is required to translate the position of output prism 22 vis-à-vis input prism 20. Again, the lateral displacement of output prism 22 must be confined entirely to a single axis to prevent wedge formation and the associated decoupling problems. Lastly, the physical size and extent of actuators 31 and 33 can limit the minimum separation distance that can be achieved between input prism 20 and output prism 22, which presents a problem when it is desired to couple into short sections of waveguide. Thus, significant improvements, both in coupling efficiency and ease of use, are made in accordance with the present invention by physically attaching a coupling prism to a wafer/die containing a waveguide.

Both examples of the prior art utilize evanescent prism coupling to enable waveguide characterization. In this application, the prism or prisms, the input light source and input optics, the actuation mechanism to bring the prism or prisms into close proximity to the waveguide, as well as the detection system, are all defined as components of the prism-coupler system. Such systems are temporarily coupled to a given waveguide for evaluation purposes only; the waveguide is then decoupled and subsequent waveguides for evaluation are introduced to the prism coupler system. The arrangement of the present invention overcomes the "temporary" nature of prior art coupling systems.

The various embodiments of the present invention all concern evanescent coupling of light into thin silicon waveguides via silicon prism structures that are produced by a combination of conventional semiconductor processes and materials methods including silicon-on-insulator, lithography, etching, thin-film deposition, anti-reflective coating, and wafer-to-wafer attachment/bonding technologies. These silicon waveguides are required to be relatively thin, "submicron", on the order of 0.35 µm or less, so as to be able to support a single mode light signal in the vertical direction. In the horizontal direction, single or multi-mode operation may be supported by choosing an appropriate width for the waveguide. Thus, during the remainder of this discussion, the waveguide may be referred to as a "single mode silicon waveguide", with the understanding that a multimode waveguide and/or a thicker waveguide may also be used and supported. The term "silicon waveguide", as used in the specification, is not considered to be limiting in the definition of the waveguide as a single layer of single-crystal silicon material. The "silicon waveguide" of the present invention may also comprise a multilayer construction of silicon and/or polysilicon materials with specific characteristics for each individual layer (i.e., doping and thickness) tailored for a variety of different device applications. In some embodiments, the silicon-based layers are separated by extremely thin dielectric layers (on the order of 100 Å or less) that still permit a high degree of coupling between the silicon-based layers within the waveguide structure.

Figure 3:
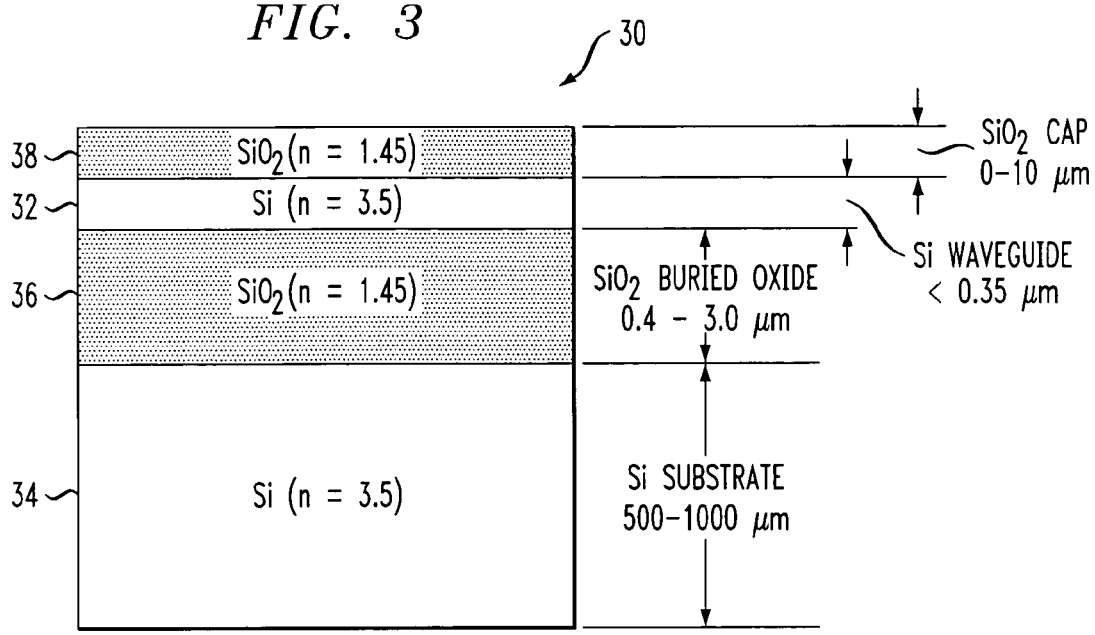
FIG. 3 illustrates a conventional multi-layer SOI wafer structure, including a relatively thin silicon waveguide layer.

A simple example of a conventional multilayer structure 30 of a wafer containing a thin silicon waveguide layer 32 that may be used in accordance with the present invention is shown in FIG. 3. The base substrate consists of a silicon layer 34 that is typically 500–1000 µm in thickness. Directly on top of silicon layer 34 is a buried oxide (or BOX) layer 36 that typically consists of 0.4–3.0 µm of silicon dioxide (or other suitable insulator material). For non-optical electronic applications, BOX layer 36 is required to achieve electrical isolation of elements in the active silicon layer 32 from the bulk silicon layer 34. For optoelectronic applications, such as in the case of the present invention, BOX layer 36 also serves as the low-refractive index medium and bottom cladding layer (n≈1.45 for silicon dioxide in the 1.1–1.6 µm region) that permits total internal reflection (TIR) at the base of silicon waveguide layer 32. In order for light to be single-mode within a high refractive index material such as silicon (n≈3.5 in the 1.1–1.6 µm region), the thickness of silicon waveguide layer 32 should not exceed 0.35 µm. In the particular embodiment as illustrated in FIG. 3, an additional thin silicon dioxide layer 38 is deposited on top of silicon waveguide layer 32 as a protective covering layer. The thickness of layer 38 may vary across the wafer, but needs to have a prescribed thickness in the optical coupling regions. If the prescribed thickness in the optical coupling regions is nonzero, layer 38 forms at least part of the evanescent coupling layer. In other sections of the wafer (not used for optical coupling) the thickness of layer 38 may be increased, so as to serve as an upper cladding layer for the optical waveguide 32, as well as to provide electrical isolation from conducting wires that may be employed in the device. Total internal reflection (TIR) within waveguide layer 32 is ensured by the use of a material for layer 38 with a relatively low refractive index, such as silicon dioxide (n=1.45), silicon nitride (n≈2.0) or air (n=1.0).

In accordance with the present invention, to couple light efficiently into the multilayer structure of FIG. 3 throughout the device lifetime, the inventive prism structure is permanently attached to a wafer (or a die portion of a wafer) containing a waveguide structure such as waveguide 32. During the attachment process, the thickness of the evanescent coupling layer must be very tightly controlled in magnitude in order to obtain optimal coupling efficiency. Subsequent to the attachment process, the optimal coupling efficiency must be maintained over the device lifetime. FIGS. 4–11, as will be discussed in detail below, all illustrate particular embodiments of the present invention that accomplish this goal. It is to be understood that the preferred "attachment" mechanism is bonding; however, other adhesives and means for providing permanent attachment of the silicon prism coupler to a wafer/die may be used. For these alternative joining methods, the physical attachment of the prism coupler to the SOI wafer or die may occur at surfaces removed from the evanescent coupling region.

To achieve high coupling efficiency, the prism structure of the present invention is defined by the following characteristics:

1) The refractive index of the prism is equal to or greater than that of the silicon waveguide;

2) The prism material exhibits a relatively high optical transmittance in the wavelength range of interest (e.g., 1.1–1.6 µm);

3) The base surface of the inventive prism that mates with the SOI wafer must exhibit a high degree of smoothness. If this condition is not met, the resultant thickness of the evanescent coupling layer will be determined by "high points" on the prism surface, instead of the desired range of values that guarantees high coupling efficiency;

4) In some embodiments, as will be described below, a well-defined edge or corner must be fabricated that sharply truncates the input beam to permit optimization of coupling during alignment. For the purposes of the present invention, the term "well-defined" means that the dimensions of typical irregularities at that edge must be much smaller than the dimensions of the projection of the input beam upon the mating or coupling surface of the prism; and 5) High-quality anti-reflection coatings are preferred on the angled facets of the prisms to prevent the significant Fresnel losses that occur when a light beam is incident from air upon a high-refractive index medium, or vice versa.

As the prism structures of the present invention will be permanently attached to the waveguide wafer, it is important that the prism structures embodied by the above-defined characteristics be fabricated reliably and reproducibly in a material that is readily obtainable. Suitable embodiments of such prism structures are illustrated in FIGS. 4–11.

As mentioned above, prior art prism coupling arrangements have not been efficient in terms of coupling energy into silicon waveguides (even in the case of temporary coupling arrangements), since prisms with a sufficiently high refractive index (n≈3.5 or higher) are not commercially available. For example, in most prism couplers, the material with the largest refractive index that is used is titanium dioxide crystal (rutile), which has an extraordinary refractive index $n_e$=2.8 in the visible portion of the spectrum, and a value closer to $n_e=2.6$ in the optical spectrum of interest to the present invention (1.1–1.6 μm). Traditional prior art optical glasses exhibit an even lower refractive index, generally on the order of $n \leq 2.1$. One possible alternative is to use prisms of GaAs, which exhibit a refractive index of $n \approx 3.6$ in the optical wavelength range of interest. However, prisms of GaAs are not readily manufacturable, since GaAs is a relatively brittle and expensive material.

In accordance with the present invention, therefore, a solution to this prior art problem is to use very similar single-crystal silicon materials for both waveguide layer 32 and the prism coupler. Single-crystal silicon prisms, as will be discussed below, can be readily and inexpensively manufactured using the same processing and fabrication techniques used to form other silicon-based electronic and optical circuits and devices. Advantageously, the optical transmittance properties of the single-crystal silicon prism are very high in the telecommunications wavelength bands of interest, as is the case for the silicon waveguides, where it is known that optical loss is less than 0.4 dB/cm in a silicon waveguide structure. For optimal device operation, it is preferred to utilize a silicon prism wafer with a refractive index that slightly exceeds that of the device silicon layer. As mentioned above, in order to satisfy the mode-matching condition from the prism to the waveguide, the prism refractive index must equal or exceed that of the waveguide. However, there will be a Fresnel reflection (thus reducing the amount of transmitted light) that depends on the refractive index mismatch between the silicon prism wafer and the silicon device layer of the SOI wafer. Thus, to fulfill the mode-matching condition but also minimize the transmission loss through the device, the refractive index of the prism wafer should be chosen to be slightly greater than the silicon waveguide layer.

One advantage of the present invention is that the desired relationship between the refractive indexes of the silicon prism coupler and the silicon waveguide layer within the SOI structure can be easily achieved by specifying appropriate ranges of resistivity values for the two silicon materials. For example, in a standard SOI wafer, the silicon waveguide layer can be doped with boron, aluminum, or gallium to produce a p-type material; or with phosphorus, arsenic, or antimony to produce an n-type material. Available silicon wafer resistivity levels cover the range from 0.001 Ω-cm (which corresponds to a doping level of $10^{20}/cm^3$ at room temperature) to 10,000 Ω-cm (which corresponds to a doping level of $10^{12}/cm^3$ at room temperature). As an example, for a commercial grade SOI wafer that has undergone all the steps associated with SOI wafer processing, the device silicon waveguide layer of a "nominally undoped" <100> SOI wafer has a resistivity value on the order of 10–20 Ω-cm (approximately $10^{15}/cm^3$ doping level at room temperature). By specifying an appropriate minimum resistivity value for the silicon prism wafer (in this example, a minimum resistivity exceeding 20 Ω-cm) and the type of dopant, it is ensured that the refractive index value of the silicon prism wafer will equal or exceed that of the device silicon waveguide layer of the SOI wafer. By specifying a maximum silicon prism wafer resistivity of approximately 1000 Ω-cm (approximately $10^{13}/cm^3$ doping level at room temperature), the refractive index of the silicon prism wafer will exceed that of the silicon device layer of the SOI wafer by about $\Delta n \leq 10^{-5}$.

Figure 4:
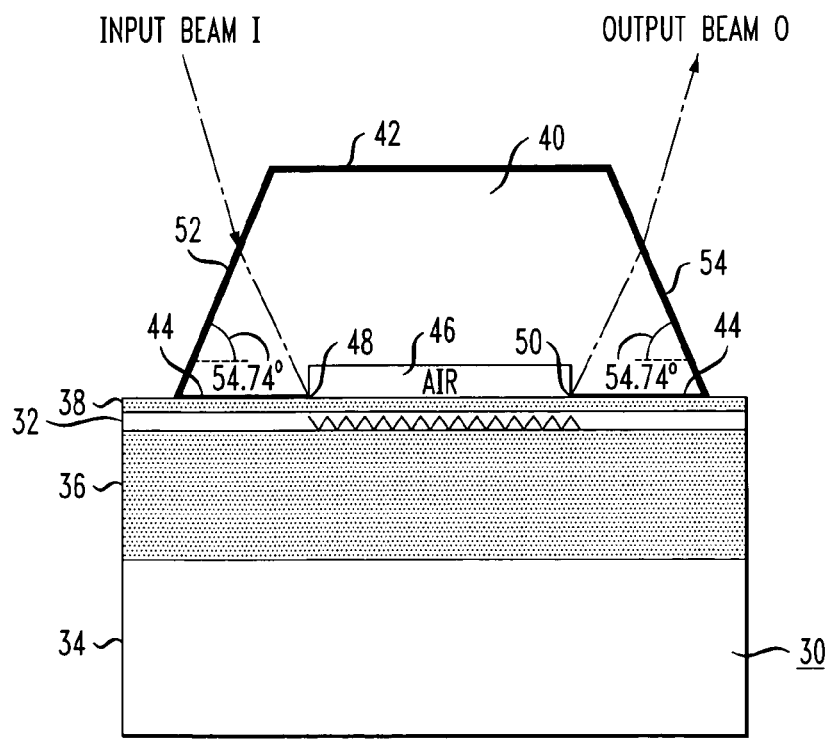
FIG. 4 contains a first embodiment of a silicon-based prism coupling arrangement formed in accordance with the present invention.

FIG. 4 illustrates a first embodiment of a prism coupling arrangement of the present invention. In this particular example, a single-crystal silicon trapezoidal prism 40 is used to provide both input and output coupling between an exterior beam and single mode silicon waveguide 32. In this case, single mode waveguide 32 has a thickness of only approximately 0.14 μm. While this choice of thickness is an exemplary value, it is to be understood that the thickness of the waveguiding layer is not so limited. An AR coating layer 42 (such as silicon nitride) is disposed to completely cover the exterior surface of trapezoidal prism 40. Since silicon has a refractive index of approximately 3.5 for the wavelength range of interest, and the medium external to prism 40 is air (n=1.0), the Fresnel loss associated with each transit through an air-silicon interface is on the order of 30%. As two such transits are required to complete the path through any given device, a 50% loss would occur at the prism surfaces alone, where this amount of loss is unacceptable for most applications. Thus, the presence of AR coating 42 serves to significantly reduce the Fresnel loss. In one embodiment, AR coating 42 may comprise a layer of silicon nitride of appropriate thickness, which has a refractive index on the order of 2.0. Other materials, or combinations of materials (in one or more layers) may also be used.

Referring back to FIG. 4, base 44 of prism 40 is shown as disposed above dielectric cladding layer 38. As mentioned above, layer 38 functions as the evanescent coupling layer for this inventive structure. In accordance with this particular embodiment of the present invention, an etched-back cavity 46 is formed through base 44 of prism 40, cavity 46 formed to provide corner edges 48,50 that facilitate the truncation of the light beam at the interface between prism 40 and layer 38.

As shown in FIG. 4, an input beam I passes through an input facet 52 of prism 40 and truncates at corner edge 48, where it is coupled through evanescent coupling layer 38 into silicon waveguide layer 32. After propagating through waveguide 32, an output beam O will encounter corner edge 50 and thereafter be coupled back into prism 40 via evanescent coupling layer 38 and ultimately exit prism 40 along output facet 54. As will be described in detail hereinbelow, input facet 52 and output facet 54 are preferably formed using an anisotropic wet etch process (that is, a process that etches different crystal planes at different rates). For a silicon wafer with a <100> crystal orientation, anisotropic wet etching produces characteristic V-groove structures, with sidewalls that form a 54.74° angle with respect to the plane of the wafer (as shown in FIG. 4). To improve the optical quality of input facet 52 and output facet 54, an additional isotropic etch step may be used to reduce the surface roughness.

In the particular embodiment of FIG. 4, etched cavity 46 comprises an air gap surrounded by bare silicon sidewalls, where air exhibits a refractive index n=1.0. The beam is required to be truncated at input corner edge 48 to prevent light that has been transferred from prism 40 to waveguide 32 from being coupled back into prism 40 via the same mechanism. The sharpness of the truncation is important in that it will determine the magnitude of the coupling efficiency. As will be discussed below, a reactive-ion etch process can be applied to a masked wafer to produce both the required corner edge and a short section of vertical wall. Other etching techniques, such as ion milling, plasma etching, wet chemical etching, or the like, may also be used to define the corner edges of the cavity within the inventive prism coupling structure.

Figure 5:
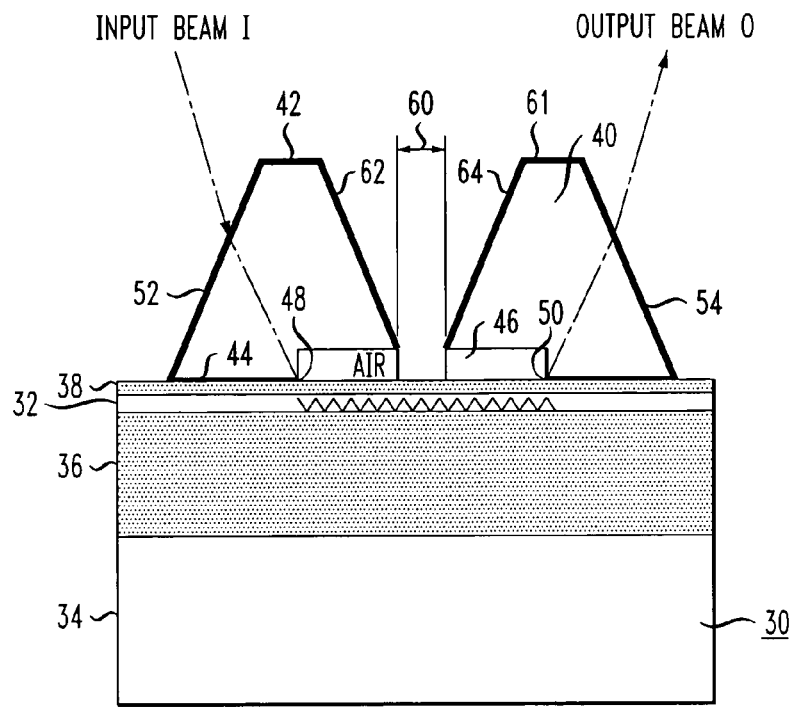
FIG. 5 contains an alternative embodiment of a silicon-based prism coupling arrangement of the present invention including etch-created areas on the die or wafer to permit optical or electrical measurement, test and inspection activities.

FIG. 5 illustrates an alternative to the embodiment of FIG. 4, where an additional window 60 is created at a location along top surface 61 of prism 40 such that an anisotropic etch process may be used to remove additional silicon material from the interior portion of prism 40, forming in this example interior edge surfaces 62, 64. If the etch continues until a portion of base surface of prism 40 is removed, the underlying region of SOI wafer will be exposed. As mentioned above, etched windows permit direct viewing of, as well as physical contact to, the underlying SOI wafer 30 in areas where visual inspection, specific optical tests and/or electrical testing is required. In the particular embodiment of FIG. 5, window 60 is opened in approximately the mid portion of trapezoidal prism 40 to allow physical contact to the device structure in waveguide layer 32 located immediately below cavity 46. Such an arrangement is exemplary only, and it is to be understood that with an appropriate mask and etch process that any desired area of SOI wafer 30 can be accessed in this manner, provided that the window is not immediately adjacent to an input/output facet structure. In this particular arrangement as shown in FIG. 5, both prism facets 52, 54 and window 60 are produced using similar anisotropic wet chemical etch processes. However, one or more windows may be produced using, for example, separate reactive ion etch processes, in that case forming vertical (rather than angled) walls in the window area.

Figure 6:
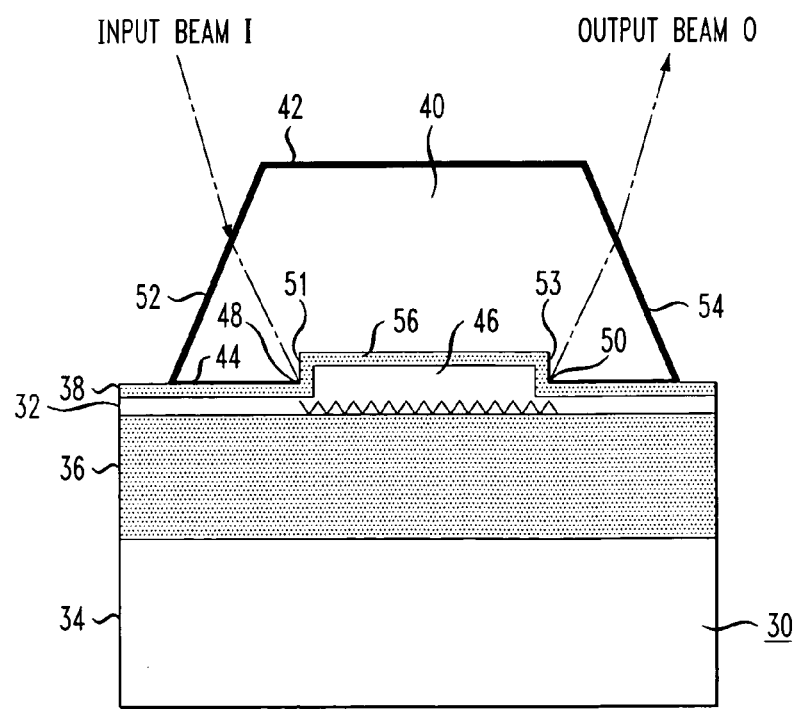
FIG. 6 is an alternative arrangement of the embodiment of FIG. 4, including a low refractive index coating layer disposed over the cavity portion of the prism structure.

Another embodiment of the present invention is illustrated in FIG. 6, where cavity 46 is shown as covered with a relatively thin layer 56 of a material exhibiting a relatively low refractive index, for example, silicon dioxide (n=1.45). In this context, "low refractive index" corresponds to a value that will provide total internal reflection at the silicon/coating interface for a typical range of angles of incidence for input beams I, and is typically less than 2. Exemplary materials that meet this criterion (apart from silicon dioxide) include silicon nitride, silicon oxynitride and silicon carbide. As will be discussed below, for device configurations in which the material or materials that constitute the evanescent coupling region are deposited or grown partially or completely upon base surface 44 of silicon prism 40 prior to attachment, the etched surfaces of cavity 46 and base surface 44 will simultaneously be coated with the same material. That is, layer 56 may be automatically created in the same process step used to deposit layer 38. One advantage of the embodiment of FIG. 6 is that all surfaces of prism 40 can be coated, protecting prism 40 from environmental hazards. In this particular embodiment, a reactive-ion etch process may be applied to a masked prism wafer to form both required corner edges 48, 50 and a short section of vertical wall 51, 53 prior to the above-described deposition step.

Figure 7:
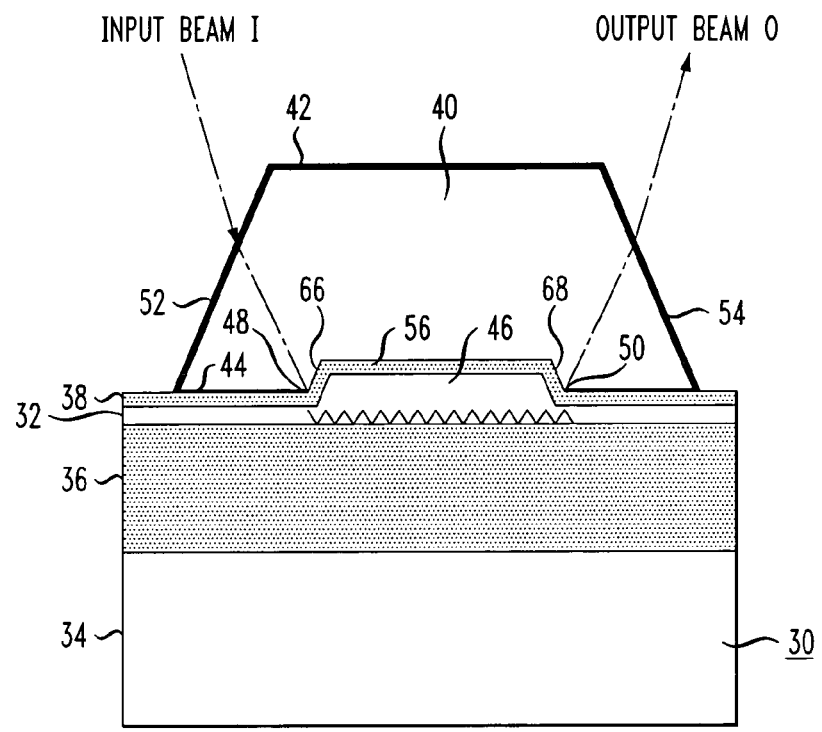
FIG. 7 is yet another alternative arrangement of the embodiment of FIG. 4, in which an anisotropic wet etch process is used to create angled cavity walls.

FIG. 7 illustrates a slight variation of the embodiment of FIG. 6, where in this case cavity 46 is formed using an anisotropic wet etch process similar to that used to form facets 52 and 54, in place of the reactive ion etch process described above. In some instances, wet etching may be a preferred method of creating cavity structures, in order to reduce the total number of different processes required for prism fabrication. As shown in FIG. 7, the use of a wet etch process yields angled sidewalls 66, 68, while still maintaining the required corner edges 48 and 50. That is, since angled sidewalls 66, 68 rise steeply from the plane of SOI wafer 30 (i.e., at an angle of 54.74°), the abrupt discontinuity at base 44 of prism 40 will naturally form the desired corner edges 48, 50. The particular embodiment of FIG. 7 also includes thin layer 56 as described above. However, it is to be understood that the use of an anisotropically etched cavity 46 may be used without such a covering layer, as is shown in the arrangements of FIGS. 4 and 5.

An advantage of the prism coupling structure of the present invention is the inherent compactness in the arrangement. The small footprint is enabled by the precise patterning available through lithographic techniques and by the high degree of alignment accuracy between (1) multiple prism structures, and (2) prism structures and the waveguide. In particular, base 44 of trapezoidal prism 40 may be short as 1–2 mm. However, since cavity 46 must be formed so as to bridge the full length of the device structure in the underlying silicon waveguide 32, base 44 is more likely on the order of 1–10 mm. By contrast, prior art arrangements that utilize adiabatic tapers to couple light from fiber inputs and outputs to thin silicon waveguides require tapers that are approximately 3 mm in length to couple to waveguides with thicknesses on the order of 3–5 µm. As tapers are required on both the input and output ports of such a prior art device, the minimum length of the light coupling structure using adiabatic tapers is approximately 6 mm. Thus, the number of devices that can be produced on a wafer of a fixed size is increased by using the smaller dimensioned arrangement of the present invention. It is anticipated that the density of devices per unit area supported by the present invention will continue to increase with improvements in silicon manufacturing and bonding technologies.

Figure 8:
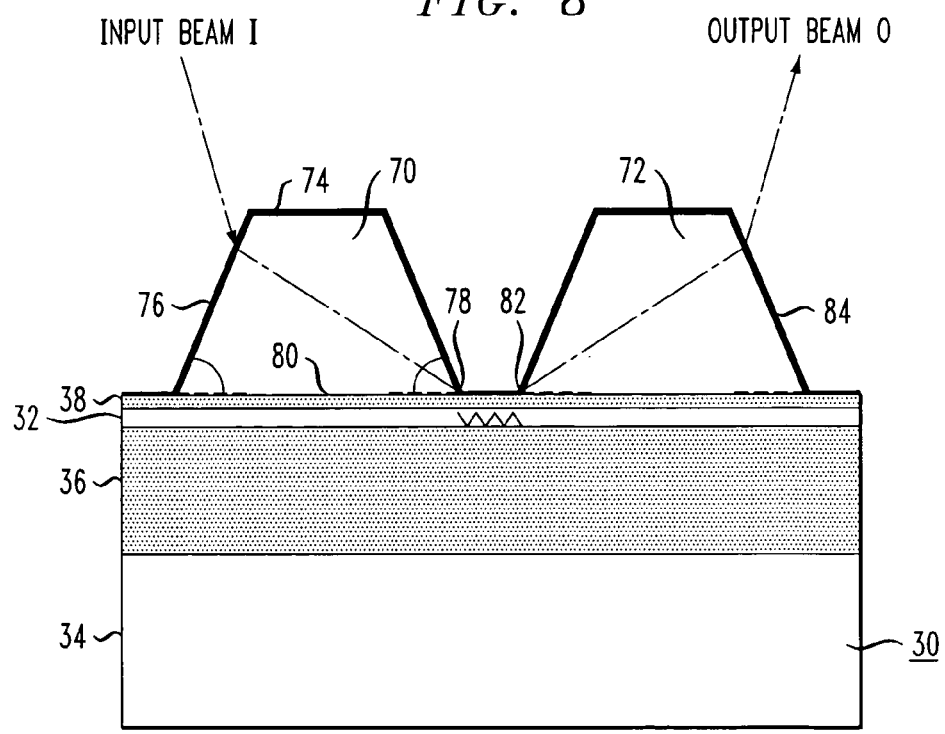
FIG. 8 includes a second embodiment of a silicon-based prism coupling arrangement of the present invention, utilizing a pair of prism couplers as separate input and output couplers.

FIG. 8 illustrates an alternative embodiment of the present invention that utilizes a pair of trapezoidal prisms 70, 72 to provide coupling into and out of silicon waveguide layer 32. An AR surface coating 74 is disposed to completely cover both input coupling prism 70 and output coupling prism 72. Depending on the exact sequence of process steps, the AR coating may cover the SOI wafer region between trapezoids, as shown in FIG. 8, or these wafer regions may remain free of the AR coating material or materials. An input beam I is coupled through input facet 76 of input prism 70 and propagates through prism 70 in the manner shown. When input beam I reaches corner termination 78 of prism 70, beam I will be coupled through evanescent coupling layer 38 into waveguide layer 32. Since the opposing corner 78 of prism 70 will truncate the beam and provide coupling, there is no need to form an etched region in the interior of prism 70 along base 80 for beam truncation purposes, as was the case for the embodiments described above in association with FIGS. 4–7. In a similar manner, edge 82 of output prism 72 will couple the light beam out of waveguide layer 32 and into prism 72, directing the output light beam O to exit along output facet 84 of output prism 72. The structure as illustrated in FIG. 8 is considered to be functionally equivalent to the above-described prism structures, provided that corner edges 78 and 82 are sharp and well-defined, applying the same criteria as mentioned above. While not depicted in FIG. 8, etched cavity structures may still be required with this embodiment, or any embodiment of the present invention, to provide necessary physical clearance above SOI wafer 30, as well as to properly mate and attach the prism wafer or die to the SOI wafer or die.

In each of the embodiments of FIGS. 4–8, evanescent coupling layer 38 is defined as a silicon dioxide layer disposed directly above waveguide layer 32 on SOI wafer 30. In the prior art, the evanescent coupling layer was an air or liquid-filled region that temporarily separated the waveguide from the prism coupler during the evaluation process. For the permanent coupling arrangements of the present invention, a reliable and stable attachment, preferably in the form of a bond, must be formed between the base surface of the silicon prism(s) and the waveguide surface of the SOI wafer. Advantageously, evanescent coupling layer 38 may be used to provide this desired attachment property. In general, evanescent coupling layer 38 can comprise any medium/material with a sufficiently low refractive index.

For the purposes of the present invention, "sufficiently low" refractive index means that the mode propagation constant is imaginary in the evanescent coupling layer 38, but real within the silicon prism and waveguide layer 32. If this condition is satisfied, the electric and magnetic fields decay exponentially across the evanescent coupling layer thickness. For example, using the mode angles and propagation constants appropriate to silicon prisms and thin silicon waveguides, a "sufficiently low" index means less than approximately 2.4. In addition, for the various embodiments as discussed above it is desirable that evanescent coupling layer 38 be compatible with conventional semiconductor processing techniques. Therefore, air (n=1.0), silicon dioxide (n=1.45) and silicon nitride (n=2.0) are all examples of appropriate evanescent coupling media that may be used in accordance with the teachings of the present invention.

Figure 9:
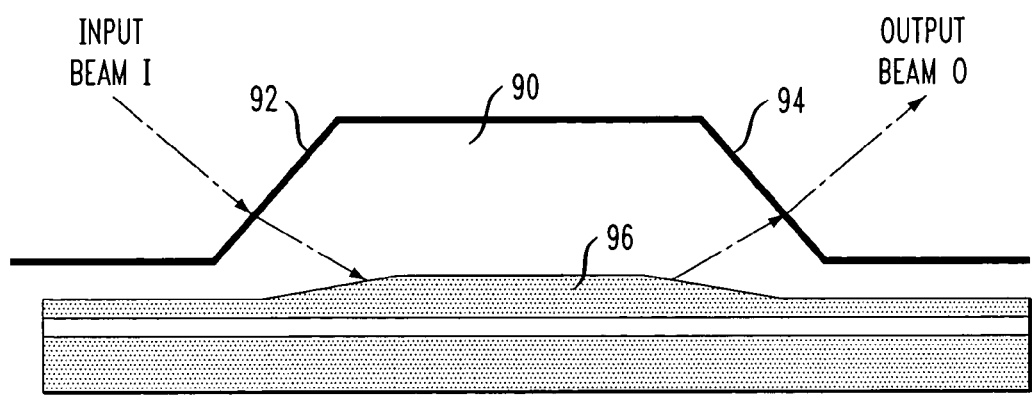
FIG. 9 illustrates yet another embodiment of the present invention, utilizing a tapered evanescent coupling region with a linearly varying thickness disposed between the thin silicon waveguide layer and the prism coupler.
Figure 10:
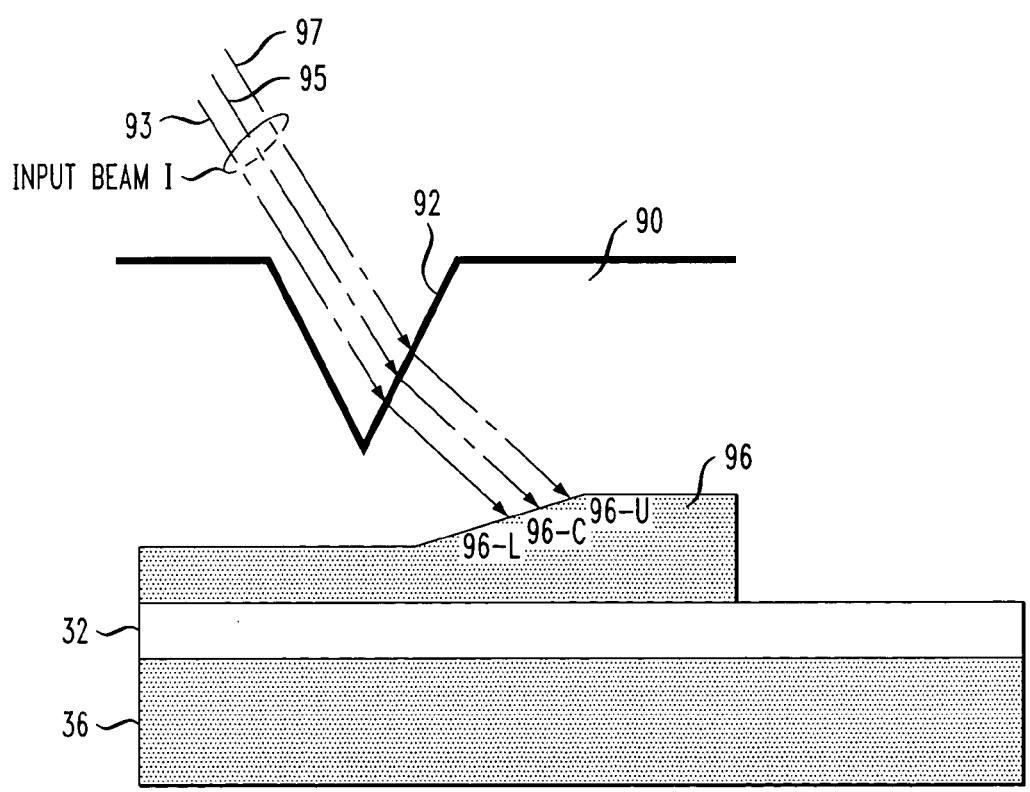
FIG. 10 is an exploded view of the input portion of the arrangement of FIG. 9.

FIG. 9 illustrates yet another alternative embodiment of the present invention, where a prism coupler 90 including an input coupling facet 92 and output coupling facet 94 is utilized with an evanescent coupling layer 96 that exhibits a linearly varying thickness, as shown. FIG. 10 is an exploded view of the input portion of the arrangement of FIG. 9, depicting a set of three rays 93, 95 and 97 that loosely define the dimensions of the input beam. Ray 93, the left-most (or lowest) ray of input beam I, is refracted to the region 96-L of evanescent coupling layer 96. Ray 95, the center ray of input beam I, is refracting to central region 96-C of evanescent coupling layer 96 and ray 97 (the uppermost ray) is refracted to upper region 96-U of evanescent coupling layer 96. Light is first coupled into region 96-L, with more and more light accumulating in the underlying silicon waveguide layer 32 as the light progresses from region 96-L to region 96-C and then into 96-U. The thickness variation is controlled such that the evanescent coupling thickness is thinner than the optimal value in region 96-L and thicker than optimal in region 96-U. Here, the term "optimal" is used to denote a thickness essentially equal to the value that maximizes coupling efficiency for an evanescent coupling layer of constant thickness. If the magnitude of the thickness variation is properly controlled, it is not necessary to form a cavity in the optical coupling region of prism 90, since the tapered evanescent coupling layer performs the same function of decoupling the light from prism 90 and into waveguide 32 (or vice versa at the output). This occurs since the thickness of tapered evanescent coupling layer 96 is sufficient large in the region beyond 96-U to prohibit light from coupling from waveguide layer 32 back into prism 90.

Although cavity structures are not required to abruptly cut off the beam in the optical coupling areas when a tapered evanescent coupling layer is utilized, similar structures may still be required to provide physical clearance above SOI wafer 30, as well as to properly mate and attach the prism wafer/die to the SOI wafer/die. As discussed above, thin dielectric layer 38 (see FIG. 3) that immediately overlies the silicon waveguide may vary in thickness from one portion of the wafer to another. In general, the regions of layer 38 that mate to the optical coupling surface are thinner than other regions of layer 38, so that the non-optical coupling regions of layer 38 form "high points" (or more accurately, "high surfaces") on SOI wafer 30. If layer 38 is directly mated to a prism wafer or die with a completely flat base surface, the optical coupling surfaces of the prism wafer and the SOI wafer will not make proper physical contact and therefore cannot be permanently attached in the manner required for the coupling arrangement of the present invention. In the above-described embodiments, the attachment process is successful because the formation of a cavity in the base surface of the prism is formed to exhibit a height of several tens of microns, automatically providing the required clearance. That is, the attachment process works because the prism wafer has a patterned, not flat, base surface. The formation of cavity structures in the prism coupler to accommodate the topology of the SOI wafer may be employed with any of the embodiments of the present invention, not only that disclosed in FIG. 11.

Figure 11:
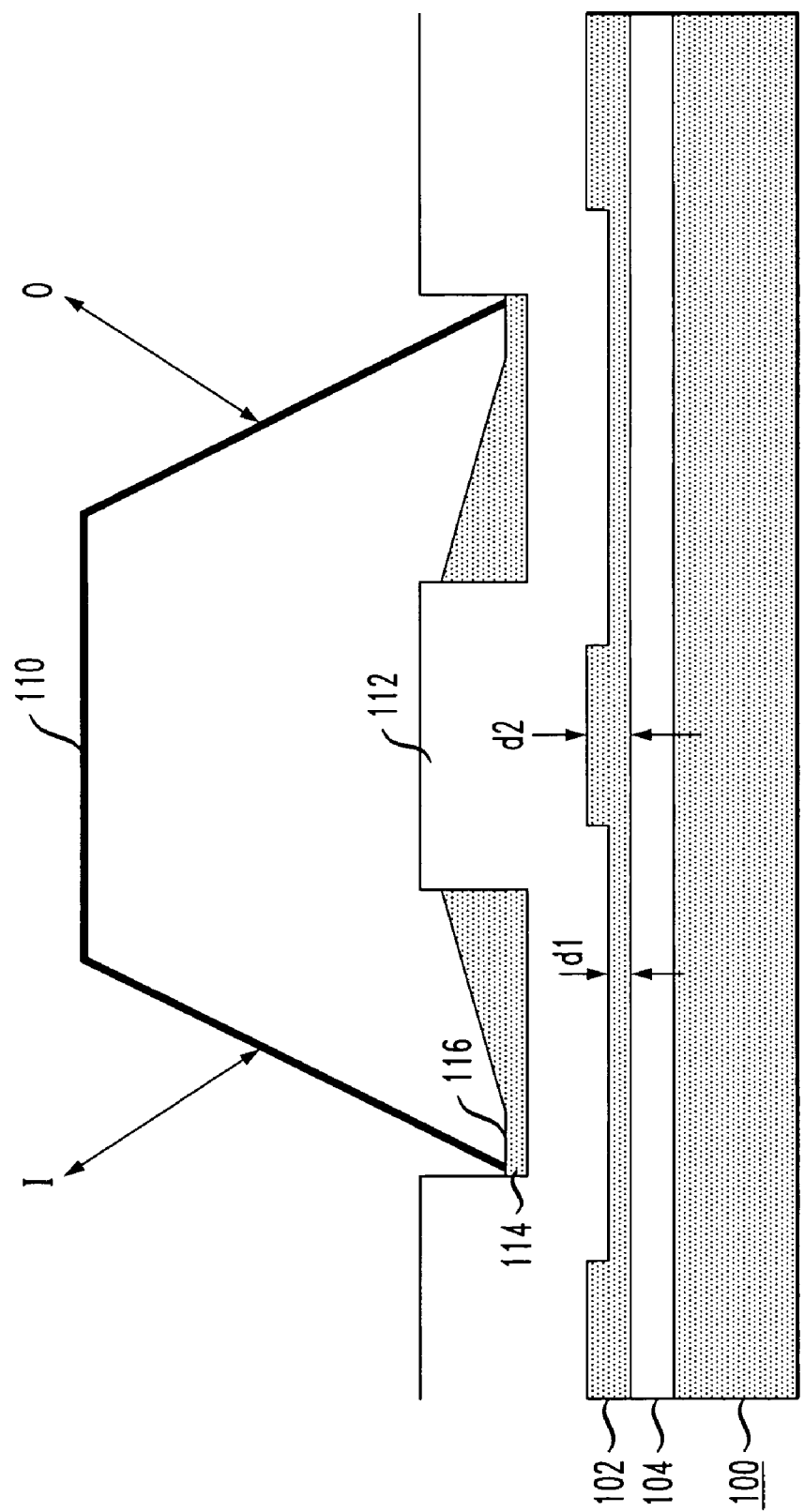
FIG. 11 illustrates an alternative to the arrangement of FIG. 9, wherein in addition to the tapered evanescent coupling region, a cavity is included in the prism coupler to accommodate various topology variations in the SOI wafer.

FIG. 11 depicts an arrangement similar to FIG. 9, except that slab SOI wafer 30 of all previous embodiments is replaced with a device SOI wafer 100 in which surface layer 102 exhibits a non-planar (or patterned) surface structure in the vicinity of the device structure in an underlying silicon waveguide layer 104. For the purposes of discussion, surface layer 102 is illustrated as having two different thickness values, $d_1$ and $d_2$, where $d_1$ is defined as the thickness in the optical coupling region and $d_2$ is defined as the thickness in device regions. In most cases, $d_1$ has a value ranging from zero to $d_2$ and $d_2$ is typically a few microns greater than $d_1$. In this coupling arrangement, a prism coupler 110 including a cavity 112 is used to couple light into and out of waveguide layer 104. The evanescent coupling layer 114 is then deposited over base surface 116 of prism 110. If cavities 112 are sufficiently deep, the dielectric material that accumulates on regions of the prism surface that are not associated with the taper will provide adequate clearance for the "high surfaces" of layer 102 on SOI wafer 100.

Figure 12:
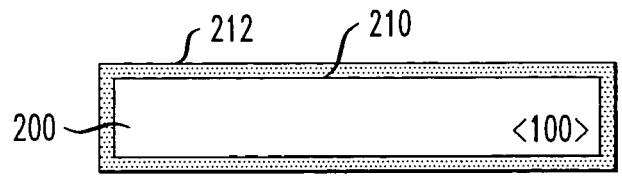
FIGS. 12–19 illustrate various major steps in an exemplary process of forming a prism coupler structure in accordance with the present invention.

FIGS. 12–19 illustrate various major steps in an exemplary process of forming a prism coupler structure in accordance with the present invention. The process steps are considered to be exemplary only, and the present invention is not considered to be limited to any particular process step choices. Referring to FIG. 12, the prism fabrication process begins with a silicon substrate 200 that is oriented along the <100> crystal plane. In accordance with the present invention, silicon substrate 200 is chosen to have a dopant species and concentration such that the refractive index of the prism wafer is at least equal to that of the silicon waveguide in an associated SOI wafer of the final structure (not shown). The thickness of substrate 200 is selected to fabricate a prism coupler with a specific height. Advantageously, a prism design based on industry standard wafer thickness (e.g., 625 μm±25 μm for a six-inch diameter wafer) will result in significant cost reduction. Base surface 210 of substrate 200 is desired to exhibit a very smooth surface to facilitate the attachment (e.g, bonding) of the completed prism wafer to the SOI waveguide wafer.

Figure 13:
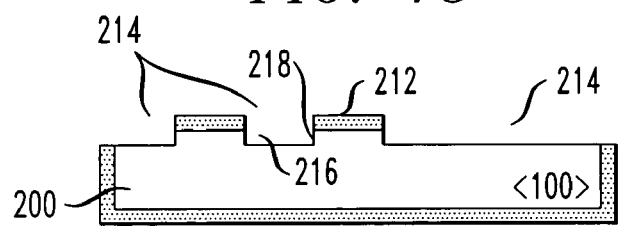
Figure 14:
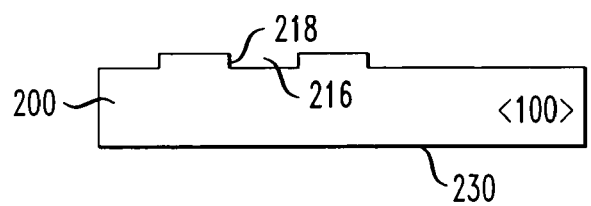

As shown in FIG. 12, a thermal oxide 212 is first grown on substrate 200 to function as a hard mask during the process of defining the cavity region (particularly required when using some deep RIE processes). A hard mask is typically defined as a material that is more resistant to a subsequent etch process than the photoresist conventionally used with standard lithography processes. Subsequent to growing oxide 212, a mask 214 is used to define layer 212 and (ultimately) cavity region 216, as shown in FIG. 13. As discussed above, cavity region 216 may be formed using an RIE process, an anisotropic wet chemical etch process, or alternatively using processes such as plasma etching or ion milling. As discussed above, sidewalls 218 of cavity 216 are then used to define the corner edges for the prism coupler. Hence, sidewall roughness that is significantly less than the wavelength of the optical beam is required for the sidewall region that is in the beam path. Subsequent to the formation of cavity 216, the remaining portions of oxide 212 are removed, as shown in FIG. 14, such as by using a buffered HF etchant.

Figure 15:
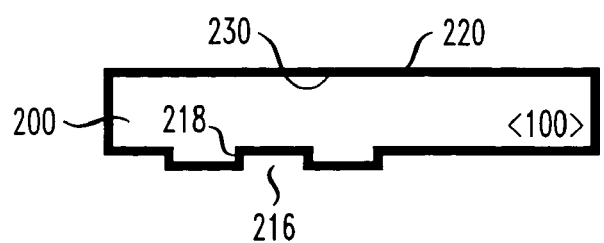
Figure 16:
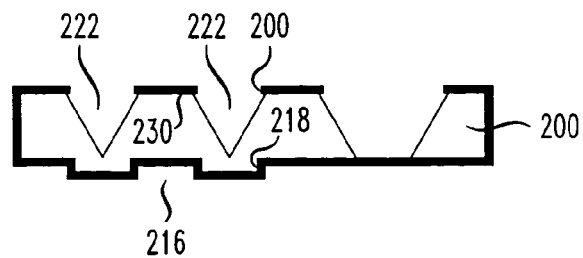

Once cavity region 216 is formed, substrate 200 is reoriented such that opposing surface 230 may be processed to form the required coupling facets. FIG. 15 illustrates substrate 200, as covered by an etch mask 220 to define the locations of the prism facets, where back-to-front alignment may be used to confirm that facets are properly formed with respect to the opposing cavity region. Surface 230 is then patterned, as shown in FIG. 16, to expose the desired areas of substrate 200 and an anisotropic wet etch process (using, for example, KOH) is used to form a set of V-grooves 222 (at an angle of 54.74° with respect to the horizontal direction). The depth of V-grooves 222 is determined by the proper selection of the openings in masking layer 220. It should be noted that alignment of the photolithography mask to the crystallographic axis of substrate 200 is highly desirable for producing smooth V-groove surfaces. To further improve the surface smoothness of the etched V-grooves, a wet isotropic polish etch may be used. It is to be noted that a through-etched window, as discussed above in association with FIG. 5, can also be etched in the same processing step using a larger opening on mask layer 220. Alternatively, the through-etched window can be formed using a separate photolithography/etch step using processes such as deep RIE.

Figure 17:
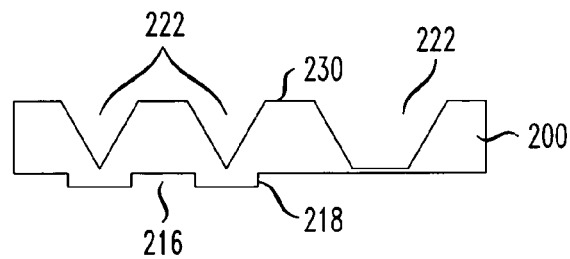
Figure 18:
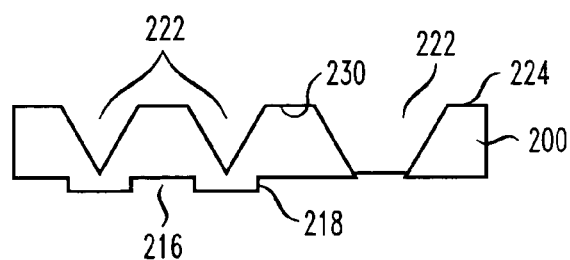

Masking layer 220 is then removed, as shown in FIG. 17, where the exposed surface is then covered with a relatively thin oxide layer 224, as shown in FIG. 18, where a portion of this layer may be used to defined the evanescent coupling layer between a prism coupler and underlying silicon waveguide. Layer 224 may be formed by using a thermal oxidation process. Other processes, such as atmospheric pressure CVD, low pressure CVD, plasma-enhanced CVD, evaporation or sputtering may also be used. Alternatively, other materials may be used to form this layer, as discussed above, where other choices include silicon nitride, silicon oxynitride, silicon carbide. For processes such as thermal oxidation or low pressure CVD, the thickness and surface roughness of layer 224 can be well controlled, an advantage for forming a precisely defined evanescent coupling layer, as well as for bonding of a prism coupler to an SOI wafer or die.

Figure 19:
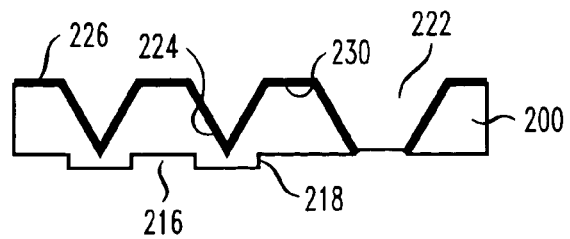

FIG. 19 illustrates the formation of an AR coating 226 on the patterned surface of substrate 200 containing V-grooves 222. Exemplary materials that may be used for this coating include oxide-based and nitride-based materials. The specifications for AR coating 226 will depend upon parameters such as the type of waveguide device used, the thickness of waveguide layer 32 (as well as the tolerances of these parameters), the diameter of the input optical beam and the wavelength range of interest. AR coating 226 may be formed prior to attaching the prism wafer to the SOI wafer, or subsequent to the attachment process. If AR coating 226 is formed prior to attachment, extra care must be taken to avoid degradation of the evanescently coupled layer and/or attachment surface by stray depositions or scratches/particulates.

To physically attach the prism wafer (or die) to an SOI wafer including an optical waveguide layer, processes similar to those described in the prior art may be used. That is, conventional attachment/bonding processes have been found sufficient to provide a permanent bond between a prism coupler and SOI waveguide layer. For example, the coupler and SOI wafer may be pressed together and fused at a high temperature to form a permanent physical bond. Alternatively, a low temperature bonding process may be used. The use of a low temperature process permits the incorporation of device structures within the SOI wafer that cannot withstand elevated temperatures. One exemplary process uses chemically activated surfaces on both the prism and SOI wafer, allowing for low temperature bonding at a relatively moderate applied pressure. The bonding chemistry must be compatible with the materials used in the SOI and prism wafers. Examples include, but are not limited to, compatibility with various integrated circuit metallizations systems and/or AR coating materials. Regardless of the materials or processes used to attach the prism coupler to the SOI wafer, the actual attachment must be sufficient to withstand dicing/sawing operations used to separate the various structures formed on a single wafer. Moreover, the attachment process should not cause any electrostatic damage to any active components on the SOI wafer. Another advantage of the semiconductor-based bonding process is the alignment accuracy that can be achieved between the two bonded substrates using integrated circuit manufacturing infrastructures. For example, alignment accuracies better than ±1 µm can be routinely achieved using commercially available tools. It should be noted that both the prism coupler and the SOI wafer will have alignment features in accordance with the intended application.

Figure 20:
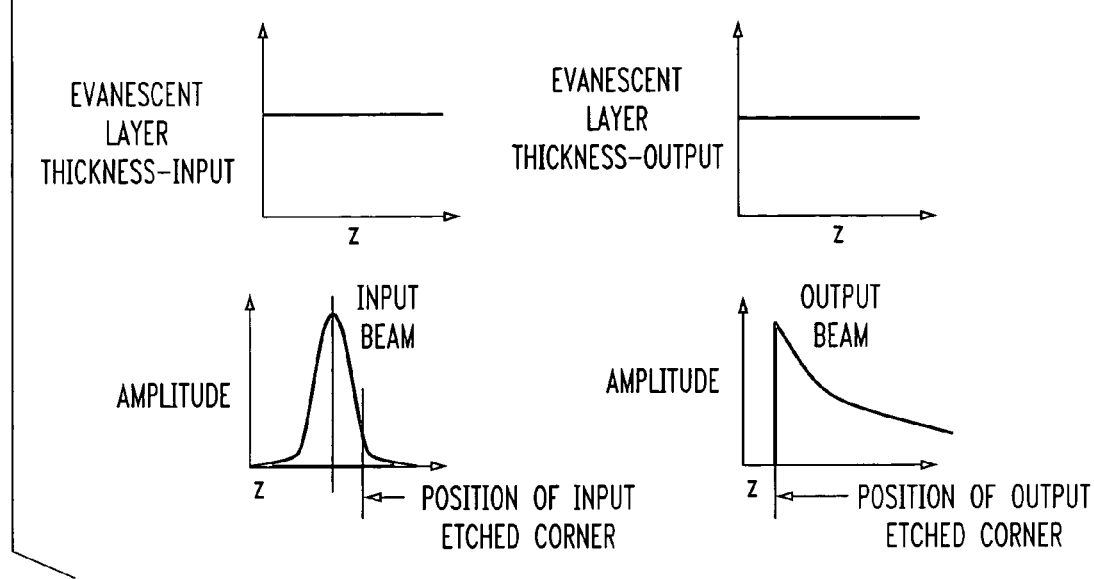
FIG. 20 is a graph of the input and output beam profiles associated with using a constant thickness evanescent coupling region.

The coupling efficiency of the trapezoidal prism optical coupler of the present invention can be defined by determining the ratio of the power in the output free-space beam relative to the power in the input free-space beam. Theoretically, for an embodiment with an evanescent coupling layer of constant thickness, this ratio cannot exceed 80%, since the coupling efficiency is ultimately limited by the different mode profiles exhibited by the input and output beams. Referring to FIG. 20, the input beam is shown as having a Gaussian profile along the propagation direction, while the beam from the output prism has an exponential profile along the propagation direction. While 80% coupling efficiency is too low to support some applications, it exceeds the value associated with other coupling techniques (for example, end-coupling or grating coupling) and benefits from ease of manufacture. Thus, for the purposes of discussion, it will be presumed that 80% coupling efficiency is sufficient.

Figure 21:
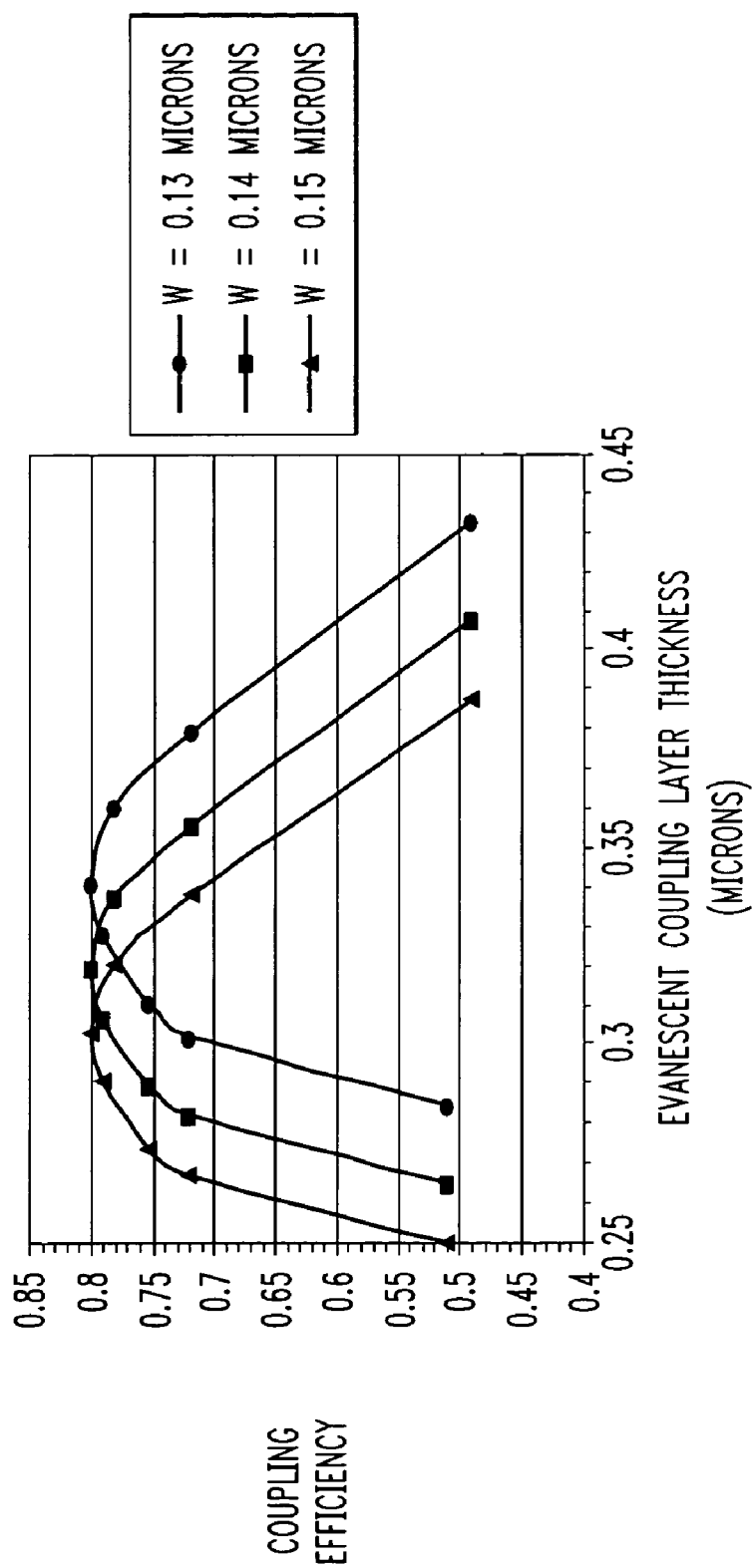
FIG. 21 is a plot of coupling efficiency as a function of evanescent coupling layer thickness, for three different silicon waveguide layer thicknesses.

FIG. 21 contains a graph illustrating the coupling efficiency for the trapezoidal coupling prism of FIG. 4, the efficiency illustrated as a function of thickness of the evanescent coupling layer 38 for three different thicknesses of waveguide layer 32. The magnitude of evanescent coupling layer 38 is assessed for an application wavelength of 1550 nm and an input free space beam diameter of 63 µm. One exemplary thickness of waveguide layer 32 is approximately 0.14 µm. The range of waveguide thickness shown in the graph of FIG. 21 (0.13–0.15 µm) represents the actual spread in layer thickness that is expected for state-of-the-art silicon-on-insulator (SOI) processes. It is evident from the graph of FIG. 21 that the evanescent coupling layer thickness must fall within ±20 nm of the preferred value of 320 nm in order to avoid decreasing the coupling efficiency by 10% (if the tolerance on the thickness of layer 32, ±0.01 µm, is taken into account). This limitation corresponds to approximately a ±6% tolerance in the evanescent coupling layer thickness, a value that is achievable by current state-of-the-art manufacturing methods.

The efficiency limit can also be translated to a specific tolerance on the flatness of the coupling layer, using the information contained in the graph of FIG. 21. If the reduction in coupling efficiency by 10% is used as the criterion, then it is known that the gap should fall within about 300–340 nm for this example. For the configuration and preferred embodiment of FIG. 4, the largest dimension of the projection of the input beam on the coupling surface is about 110 μm (for a free-space input beam diameter of 63 μm). Thus, the maximum permitted wedge is about 0.04 μm/100 μm=4×10$^{-4}$ radians or 0.02°. It is to be noted that if the free-space beam diameter were closer to 180 μm, the permitted wedge would be three times smaller, or 0.007°. Thus, the manufacturing tolerance on the permitted wedge of the evanescent coupling layer is significantly eased by reducing the input beam diameter.

To improve the coupling efficiency of the prism coupling arrangement of the present invention, the mode profile of the output beam can be made to more closely match that of the input beam. As the input beam from a laser source or input fiber will be Gaussian, the best way to improve the coupling efficiency is to make the output profile be more similar to that of a Gaussian beam. While the output beam in general will not be truly Gaussian, if the overlap integral of the new output beam with the input Gaussian beam exceeds the overlap integral of the exponential envelope with the input Gaussian beam, the coupling efficiency can be improved beyond 80%.

It is known from the prior art that one method of modifying the shape of the output beam is to grade the thickness of the evanescent coupling layer along the propagation direction, as shown in the embodiment of FIG. 9. That is, if the evanescent coupling layer retains an essentially constant thickness, as shown in FIGS. 4–8, light will be coupled out of waveguide layer 32 and into prism 40 with the same coupling strength at all points, resulting in an output beam profile given by $g(z) \propto \exp(-\alpha z)$. FIG. 20 contains graphs illustrating the thickness of the evanescent coupling layer in the "input" and "output" areas above waveguide layer 32, as well as graphs of the beam profile at the input and output. As shown, the input beam is essentially Gaussian, and the output beam follows the exponential relation as discussed above. The position of the input corner 48 (see FIG. 4) is shown on the input beam graph and the position of output corner 50 is shown on the output beam graph.

Figure 22:
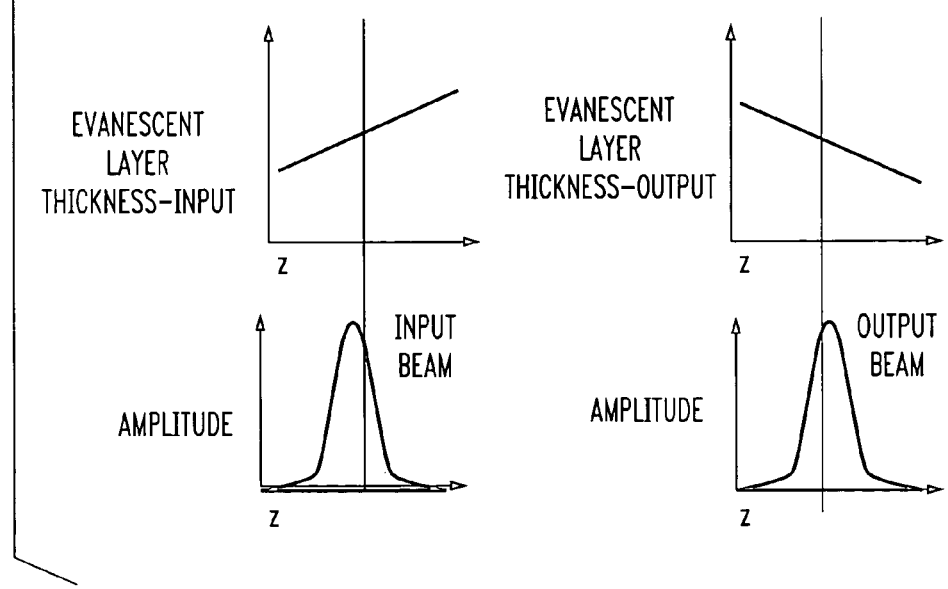
FIG. 22 is a graph of the input and output beam profiles associated with using a tapered thickness evanescent coupling region.

FIG. 22 illustrates the evanescent layer thickness profiles and input/output beam shapes associated with using a tapered evanescent coupling layer. If the output beam is to be more closely matched to the input beam, the first light exiting from the prism surface should be coupled fairly weakly, so that most of the light remains in the waveguide. To ensure that this occurs, the thickness of the evanescent coupling layer should be well above the value required for optimum coupling. After this point, the coupling strength seen by the light needs to increase so that the majority of light can be extracted to form the peak of the "Gaussian"-like output beam. Thus, this portion of the beam must sample the interface where the evanescent layer is close to the optimal thickness. The majority of the energy is transferred from waveguide layer 32 and exits the system entirely through prism 40. Although the coupling strength continues to increase with the decreasing evanescent layer thickness, the amount of light exiting prism 40 starts to decrease as the light in the waveguide drops to lower and lower levels. In this manner, a more Gaussian-like profile for the output beam is achieved, as shown in FIG. 22. The optimum location of input and output beam coupling, with respect to evanescent layer thickness and beam amplitude, is also shown in the graphs of FIG. 22.

While the invention concerns the design, geometry, construction, and attachment of a silicon-based prism die or wafer to an SOI device wafer, similar silicon-based prism dies or wafers can be attached in the same manner to wafers that include waveguides formed from any material that has a lower refractive index than silicon. Some exemplary waveguide materials are indium phosphide, (n≈3.2 at 1550 nm) and lithium niobate (n≈2.1–2.2 at 1550 nm), although the choices are not limited to these two materials. While such device wafers cannot be manufactured with standard silicon processing techniques or features, applications for these wafers could still benefit from the inventive silicon prism coupler and attachment processes described here for optical input and output ports.

It is to be understood that the above-describes embodiments and processes of the present invention are exemplary only and should not be considered to define or limit the scope of the present invention as defined by the following:

What is claimed is:

1. An optical coupling arrangement for providing a signal path into and out of a silicon optical waveguide formed in a surface layer of a silicon-on-insulator (SOI) wafer, the optical coupling arrangement comprising
    a silicon-based prism coupler permanently attached to the SOI wafer in a manner such that a first, base surface of said prism coupler is disposed substantially parallel to, and mated with, an upper waveguide surface of said SOI wafer, the prism coupler including a cavity formed within the first, base surface wherein the refractive index of said silicon-based prism coupler at least equal to the refractive index of said silicon optical waveguide; and
    an evanescent coupling region disposed between said silicon-based prism coupler and said silicon optical waveguide.

2. An optical coupling arrangement as defined in claim 1 wherein the thickness of the silicon optical waveguide is less than 1 μm.

3. An optical coupling arrangement as defined in claim 1 wherein the silicon optical waveguide is configured to support propagation of a single mode optical signal.

4. An optical coupling arrangement as defined in claim 1 wherein the silicon optical waveguide comprises a multi-layer structure of silicon-based layers, separated by relatively thin dielectric layers.

5. An optical coupling arrangement as defined in claim 1 wherein a second, opposing surface of the silicon-based prism coupler is covered by an anti-reflective (AR) coating.

6. An optical coupling arrangement as defined in claim 1 wherein the silicon-based prism coupler and the silicon optical waveguide are formed to include dopants of a predetermined species and concentration such that the refractive index of said silicon-based prism coupler is equal to or slightly greater than the refractive index of said silicon optical waveguide.

7. An optical coupling arrangement as defined in claim 1 wherein the evanescent coupling region comprises a thin film layer of a material comprising a refractive index less than the refractive index of both the silicon-based prism coupler and the silicon optical waveguide.

8. An optical coupling arrangement as defined in claim 7 wherein the thin film layer evanescent coupling region is formed as a surface layer across the first, base surface of the silicon-based prism coupler.

9. An optical coupling arrangement as defined in claim 7 wherein the thin film layer evanescent coupling region is formed as a surface layer above the silicon optical waveguide layer within the SOI wafer.

10. An optical coupling arrangement as defined in claim 7 wherein the thin film evanescent coupling region comprises a multi-layer structure.

11. An optical coupling arrangement as defined in claim 10 wherein the multi-layer evanescent coupling region comprises at least one layer formed across the first, base surface of the silicon-based prism coupler and at least one layer formed as a surface layer of the SOI wafer.

12. An optical coupling arrangement as defined in claim 7 wherein the evanescent coupling region comprises a thin film of a material chosen from the group consisting of: silicon dioxide, silicon nitride, silicon oxynitride and silicon carbide.

13. An optical coupling arrangement as defined in claim 1 wherein the evanescent coupling region comprises a layer of relatively constant thickness.

14. An optical coupling arrangement as defined in claim 1 wherein the cavity is formed using an etching process to form abrupt corner edges along the region where the cavity meets the flat bottom base surface.

15. An optical coupling arrangement as defined in claim 14 wherein an RIE etching process is used to form the cavity with essentially vertical sidewalls.

16. An optical coupling arrangement as defined in claim 14 wherein an anisotropic wet chemical etching process is used to form the cavity with angled sidewalls.

17. An optical coupling arrangement as defined in claim 1 wherein the evanescent coupling region comprises a layer of tapered thickness so as to exhibit a predetermined small thickness in regions where only a small portion of incident light intensity is required to be transferred from the silicon-based prism coupler to the silicon optical waveguide, said thickness thereafter monotonically increasing as the fraction of light intensity transferred from said silicon-based prism coupler to said silicon optical waveguide increases.

18. An optical coupling arrangement as defined in claim 1 wherein the silicon-based prism coupler comprises a single trapezoidal geometry, a first facet of said coupler defined as an input coupler and a second, opposing facet defined as an output coupler, wherein the trapezoidal flat bottom surface is defined as the first, base surface of said prism coupler, said flat bottom surface disposed substantially parallel to the associated SOI wafer and including a formed therein.

19. An optical coupling arrangement as defined in claim 18 wherein the surfaces of the at least one cavity are coated with a material having a refractive index that is sufficiently low so as to permit total internal reflection at the corner edges.

20. An optical coupling arrangement as defined in claim 1 wherein the silicon-based prism coupler comprises a pair of trapezoidal prisms sharing a base surface disposed substantially parallel to the SOI wafer, a first trapezoidal prism defined as an input prism and including an input facet for use as an input coupler and a first cavity disposed along the shared base surface thereof, and a second trapezoidal prism defined as an output prism and including an output facet for use as an output coupler and a second cavity disposed along the shared base surface thereof.

21. An optical coupling arrangement as defined in claim 1 wherein the silicon-based prism coupler is permanently attached to the SOI wafer by bonding the first, base surface of said silicon-based prism coupler to an upper waveguide surface of said SOI wafer.

22. An optical coupling arrangement as defined in claim 1 wherein the cavity within the base surface of the silicon-based prism coupler is configured to facilitate the attachment of said prism coupler to the surface of the SOI wafer.

23. An optical coupling arrangement as defined in claim 22 wherein the cavity is configured to provide a clearance above a patterned surface of the SOI wafer while also providing physical contact between the silicon-based prism coupler and the SOI wafer.

* * * * *